United States Patent Office 3,734,976
Patented May 22, 1973

3,734,976
HALOGENATED TRIAZINE ELASTOMERS
Edwin Dorfman and William E. Emerson, Grand Island, Claude T. Bean, Jr., Niagara Falls, and Russell L. K. Carr, Grand Island, N.Y., assignors to Hooker Chemical Corporation, Niagara Falls, N.Y.
No Drawing. Filed Mar. 11, 1966, Ser. No. 533,430
Int. Cl. C08g 33/06, 33/04
U.S. Cl. 260—823                                42 Claims

ABSTRACT OF THE DISCLOSURE

This invention relates to linear or essentially linear triazine elastomers containing at least one triazine ring of the following general formula:

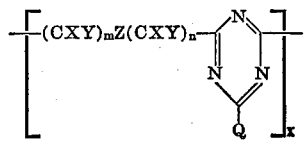

where $x$ is one to one million, the Q halogenated organic radicals are the same or different pendant groups comprising halo lower alkyl, substituted halo lower alkyl where the substituents are chosen from alkoxycarbonyl-, carbamoyl- carboxy-, haloformyl-, nitro-, nitroso-, dialkoxy phosphonate-, perhalo lower alkoxy-, aryl-, halogenated aryl-, cyano-, perhalo lower alkene, and perhalo lower alkyne, perfluoro lower alkyl polyoxyalkylene where each alkylene unit has from 2 to 10 carbon atoms and the units are from one to 35 in number, and the —(CXY)$_m$Z(CXY)$_n$— radical is a difunctional polyhalo organic radical in which the X's in any (CXY) group are halogens selected from the group consisting of chloro- and fluoro-, the Y's in any (CXY) group are selected from halogen and perhalo lower alkyl, $m$ and $n$ are positive integers greater than zero and the sum of $m$ plus $n$ plus the number of equivalent units in Z is at least four and Z is selected from perhalo lower alkylene, perhalo lower alkylidene, omega-hydroperhalo lower alkylidene, keto, oxy, thio, sulfoxide, sulfone,

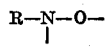

wherein R is perhalo lower alkyl or omega-hydroperfluoro lower alkyl, poly-perfluorooxyalkylene where each alkylene unit has from two to ten carbon atoms and the units are from 2 to 35 in number, poly(perfluoroalkylenedioxy) where each alkylene unit has from 2 to 10 carbon atoms and the units are from 2 to 35 in number, perfluoroalkylenedioxy, perhalo lower alkyl-amino, perhalocyclopentylene, perhalocyclohexylene, perhalopyridinediyl, perhalopyrazolidinediyl, perhalopyranylene, perhlopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl, and mixtures thereof. The triazine polymers are useful as sealants, resins, electrical insulations, damping materials, viscosity modifiers of fluids for use at high temperature, greases, lubricants, hydraulic fluids, and the like.

This invention relates to new and useful halogen-containing polymers and more particularly to fluorinated polymers containing triazine groups in the polymer chain.

It is an object of this invention to provide new halogenated polymers containing triazine groups in the polymeric chain.

It is another object of this invention to provide a process for the production of liquid low molecular weight polymers. It is another object of this invention to provide a process for the production of polymeric greases in contrast to liquid, low molecular weight polymers. It is another object of this invention to provide elastomeric polymers in contrast to liquid polymers.

Still another object is to provide a process for the production of high molecular weight, linear or essentially linear polymers which are soluble in organic solvents, such as alkyl acetates, alkyl perfluoroalkanoates, or fluorinated solvents, such as fluorinated xylenes and fluorine-containing triazines. Another object is to provide linear polymers containing reactive sites whereby said polymers can be cross-linked. Another object is to provide new and useful solutions of high molecular weight polymers.

These and other objects of this invention are accomplished by the polymers which contain at least one triazine ring of the following general formula:

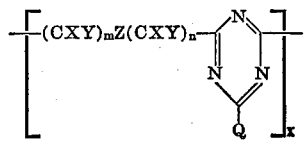

where $x$ is one to one million, the Q halogenated organic radicals are the same or different pendant groups comprising halo lower alkyl, substituted halo lower alkyl where the substituents are chosen from alkoxycarbonyl-, carbamoyl-, carboxy-, haloformyl-, nitro-, nitroso-, dialkoxy phosphonate-, perhalo lower alkoxy-, aryl-, halogenated aryl-, cyano-, perhalo lower alkene, and perhalo lower alkyne, perfluoro lower alkyl polyoxyalkylene where each alkylene unit has from 2 to 10 carbon atoms and the units are from one to 35 in number, and the —(CXY)$_m$Z(CXY)$_n$— radical is a difunctional polyhalo organic radical in which the X's in any (CXY) group are halogens selected from the group consisting of chloro- and fluoro-, the Y's in any (CXY) group are selected from halogen and perhalo lower alkyl, $m$ and $n$ are positive integers greater than zero and the sum of $m$ plus $n$ plus the number of equivalent units in Z is at least four and Z is selected from perhalo lower alkylene, perhalo lower alkyldidene, omega-hydroperhalo lower alkylidene, keto, oxy, thio, sulfoxide, sulfone, perfluoroalkyl

poly-perfluorooxyalkylene where each alkylene unit has from two to ten carbon atoms and the units are from 2 to 35 in number, poly(perfluoroalkylenedioxy) where each alkylene unit has from 2 to 10 carbon atoms and the units are from 2 to 35 in number, perfluoroalkylenedioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl. The halogens represented by the X's and Y's in the —(CXY)$_m$Z(CXY)$_n$— difunctional radical can be the same or different halogens selected from the group consisting of chlorine and fluorine.

In a preferred class of pendant Q radicals on the triazine ring in the triazine polymer are perhalo lower alkyl groups and omega-hydroperhalo lower alkyl groups where the halogens are chlorine or fluorine or mixtures of them. In a triazine polymer with many triazine rings in it, there can be more than one type of pendant group.

This results when having used a mixture of acylating agents. Under such cases it is preferred that above about 80 percent of the pendant groups be from above preferred class the balance be cyano perhaloalkyl groups.

The above "lower alkyl" groups have from one to ten carbon atoms in them.

The above-defined divalent polyhalo organic radicals can be the same or different. The preferred divalent polyhalo organic radicals are the polyhaloalkylene groups having at least four carbon atoms in the chain in which the carbon atoms alpha ($\alpha$) to the triazapentadiene or triazine group is perhalogenated and the carbon atom beta ($\beta$) to the triazapentadiene or triazine group is at least partially halogenated. Perfluoroalkylene groups are preferred, that is, the alkylene radical wherein all hydrogen atoms have been replaced by fluorine atoms, the chain length of the alkylene group is between 4 and 45 carbon atoms with the lenghts between 4 and 22 being preferred.

Another preferred divalent polyhalo organic radical is a polyperfluorooxyalkylene where each alkylene unit has from 2 to 10 carbon atoms and the units are from 2 to 35 in number.

Among the alkylene groups to be included within the scope of this invention are perfluoro lower alkylene, such as perfluorobutylene, perfluoropentamethylene and perfluorohexamethylene, branched chain alkylene groups, such as perfluoroethylbutylene, perfluoromethylhexamethylene, perfluorobutyldodecamethylene, phenylperfluorohexamethylene, substituted phenylperfluorohexamethylene where the substituents are selected from the chlorofluoro-, nitro, nitroso, alkoxy, alkoxycarbonyl, vinyl and styryl. A preferred alkylene group is a perfluoro lower alkyltetramethylene group, especially the perfluoroethyltetramethylene group.

The term "triazapentadiene" as used throughout the specification and claims refers to a divalent radical of the formula

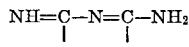

The triazine polymers formed by reaction of these triazapentadiene polymers with an acylating agent will normally be terminated by nitrile or amidine groups. The presence of impurities in either the dinitrile, diamidine, diluent or equipment or the special nature of the manufacturing process causes the terminal groups on the triazapentadiene polymer to have other groups which may not participate in a polymerization reaction with a nitrile group or ammonia, or an amidine group. Thus, if the dinitrile contained perhaloalkyl nitrile, or omega-hydroperhaloalkylnitrile, the polymers are terminated, to some extent at least, with perhalo-alkyl or omega-hydroperhaloalkyl groups. If the dinitrie contained ester or amide functions, then terminal groups include the corresponding ester or amide groups respectively.

Other terminal groups can be used, such as, alkyl imidates, and their acylated alkyl imidates, thio alkyl esters, thio aryl esters, thiol alkyl esters, thiol aromatic esters, alkyl groups, omega-hydroperfluoroalkyl groups, perhaloalkyl groups, perhaloalkene groups, perhaloalkyene groups, aryl groups such as phenyl, tolyl, nitrophenyl, chlorophenyl, methoxyphenyl, acetaminophenyl, and dimethylaminophenyl, lower alkyl ester groups, aryl ester groups, carbourea

groups, and lower acylated amidine

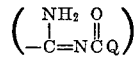

groups where Q is as defined above. These end groups would normally be derived to a substantial extent from the starting materials, including the impurities present.

Polymer branching can be introduced at the triazapentadiene group by the presence of an acylating compound which also contains a nitrile group. Thus chlorocarbonylperhaloalkylcyanides, which may be present in the dinitrile being used acylate a triazapentadiene group and cause growth of a polymer branch from the pendant nitrile group.

Other compounds which cause branching are nitrile carboxylic anhydrides, nitrile-dinitrophenyl esters, nitrile-sulfonic anhydrides, nitrile-phosphoric anhydrides, nitrile-carboxylic acid bromides, fluorides, and iodides, nitrile isocyanates, nitrile-carbodiimides, and the like. Very active dinitiles, such as perfluoromalononitrile, perfluorosuccinonitrile, and perfluoroglutaronitrile, could also react at a triazapentadiene group and initiate chain-branching.

According to the present invention, the above-described triazine polymer is formed by treatment of a triazapentadiene polymer described above and in copending application Ser. No. 533,418, filed Mar. 11, 1966, now U.S. Pat. 3,489,727 with a halogenated acylating and dehydrating agent, i.e., an organic anhydride or acid halide of a strong carboxylic acid, etc., where —Q represents the pendant organic radical in it. It has been found these acylating agents have a bond on the

group of sufficiently reactive nature to permit facile acylation of the triazapentadiene groups with the

group. These halogenated acylating agents are defined as being selected from compounds of the general formulae QCOJ, QCOOH, and (QCO)$_2$O, where Q is as defined above and J is halogen selected from chlorine, bromine, fluorine and iodine.

Examples of such acylating compounds are perhalo lower alkyl acylating agents such as trichloroacetyl chloride, trichloroacetic anhydride, trifluoroacetyl chloride, trifluoroacetic anhydride, chlorodifluoroacetyl chloride, dichlorofluoroacetyl chloride, bromodifluoroacetyl chloride, iododifluoroacetyl chloride, bromodichloro acetyl chloride, bromochlorofluoroacetyl fluoride, perfluoropropionic anhydride, perfluoropropionyl bromide, perfluoropropionyl fluoride, perfluorobutyryl bromide, perfluorobutyryl fluoride, perfluorobutyryl chloride, perfluorobutyric anhydride, perfluorooctanoyl chloride, perfluoroheptanoyl chloride, perfluorooctanoyl chloride, perfluorooctanoyl bromide, perfluorooctanoic anhydride, and perfluorooctanoyl fluoride, omega-hydroperhalo lower alkyl acylating agents such as difluoroacetyl chloride, difluoroacetyl fluoride, difluoroacetyl bromide, difluoroacetic anhydride, chlorofluoroacetyl chloride, chlorofluoroacetic anhydride, 2,2,3,3-tetrafluoropropionyl chloride, 2,2-dichloro-3,3-difluoropropionyl chloride, and 2,2-dibromo-3,3-dichloropropionyl chloride, halogenated lower alkyl acylating agents such as chloroacetyl chloride, fluoroacetyl chloride, bromofluoroacetyl chloride, difluoroacetyl chloride, chlorofluoroacetyl chloride, fluoroacetic anhydride, tetrafluoropropionic anhydride, iododifluoropropionyl chloride, trichlorobutyryl chloride, and dichlorodifluorobutyric anhydride, cyanoperhalo lower alkyl acylating agents such as cyanodifluoroacetic anhydride, cyanodifluoroacetyl chloride, cyanoperfluoropionic anhydride, cyanoperfluoropropionyl chloride, cyanoperfluorobutyryl chloride, cyanoperfluorobutyryl bromide, cyanoperfluorobutyryl fluoride, cyanoperfluorobutyric anhydride cyanoperfluoropentanoyl chloride, cyanoperfluorohexanoyl chloride, cyanoperfluoroheptanol chloride, cyanoperfluorooctanoyl chloride, cyanoperfluorononanoyl chloride, cyanoperfluorodecanoyl chloride, cyanoperfluoroundecanoyl chloride, cyanoperfluorododecanoyl chloride, cyanoperfluorotridecanoyl chloride, and cyanoperfluorotetradecanoyl chloride, haloformylperhalo lower alkyl acylating agents such as difluoromalonyl chloride, prefluoroadipyl chloride, perfluoroglutaryl chloride and perfluorosuccinyl chloride, cyclic anhydride acylating agents such as tetrafluorosuccinic anhydride and perfluoroglutaric anhydride, alkoxycarbonylperhalo lower acylating agents such as carbomethoxydifluoroacetyl chloride, carboethoxydifluoroacetyl chloride, and carboethoxyperfluoropropionyl chloride, carbamoyl perhalo lower alkyl acylating agents such as carbamoyldifluoroacetic anhydride, perfluoroadipamidolyl chloride, perfluoroglutarimide, perfluorosuccinimide, and perfluoroadipimide, nitroperhalo lower alkyl acylating agents such as nitrodifluoroacetic anhydride, mixed anhydrides such as perhalo lower alkylacyl acylating agents such as trifluoroacetylacetate, trifluoroacetylmethylsulfonate, trifluoroacetyldimethyl phosphate, trifluoroacetyl benzoate, trifluoroacetyldithioacetate, and trifluoroacetylthioacetate, nitroperfluoro lower alkyl acylating agents such as nitrosodifluoroacetyl chloride, perhalo lower alkene acylating agents such as perfluoroacrylic anhydride, perfluoromethylacrylyl chloride and anhydride and perfluorocrotonic anhydride, perhalo lower alkyne acylating agents such as perfluorobutynoic anhydride, dialkoxy phosphonate perhalo lower alkyl acylating agents such as diethylchloroformyldifluoromethyl phosphonate, perhalo lower alkoxy perhalo lower alkyl acylating agents such as perfluoroethoxypropionyl chloride, aryl perhalo lower alkyl acylating agents such as phenyldifluoroacetyl chloride and anhydride, haloaryl perhalo lower alkyl acylating agents such as chlorophenyldifluoroacetyl chloride, and pentafluorophenyldifluoroacetic anhydride, perfluoro lower alkyl polyoxoalkylene where each alkylene unit has from two to ten carbon atoms and the units are from one to 35 in number, such as perfluoroethoxyethoxyethoxyacetyl fluoride, and the like.

Throughout this specification and claims when referring to halogens in the pendant Q group, is meant those chosen from chlorine, bromine, fluorine and iodine.

Equations 2–8 illustrate the conversion of the triazapentadiene polymers to the corresponding triazine polymers:

(2)
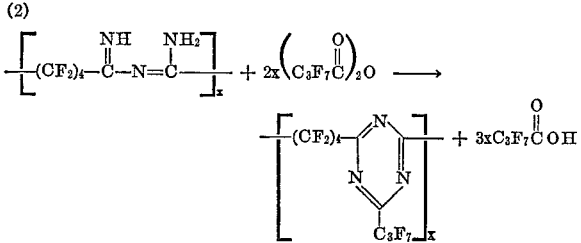

(3)
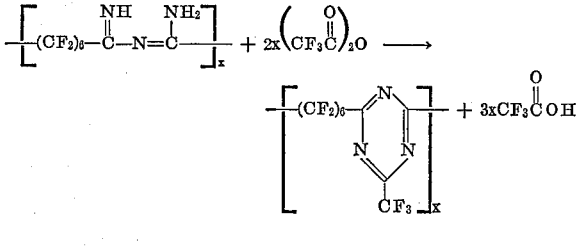

(4)
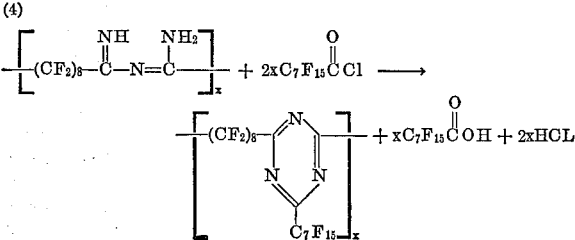

(5)
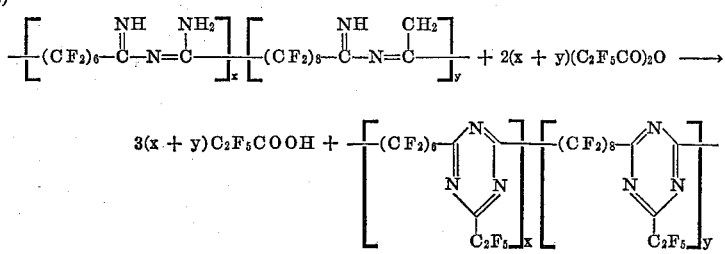

(6)
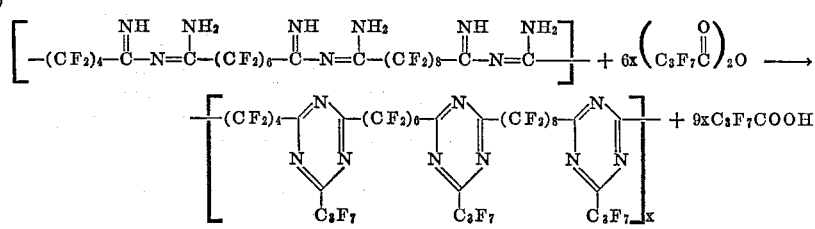

(7)
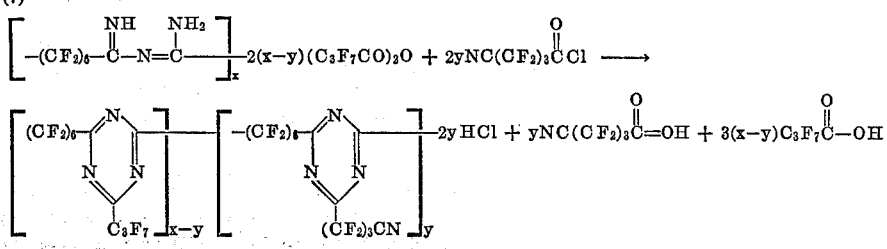

(8)

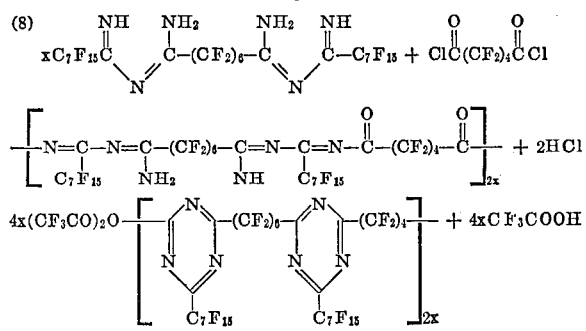

Generally the process of this invention is carried out at a temperature from about minus 80 degrees centigrade to about 200 degrees centigrade or the reflux or boiling point of the reagent, but is most preferably carried out at a temperature below 70 degrees centigrade. At temperatures below minus 80 degrees centigrade the reaction becomes slower and some reagents freeze.

The process is carried out by addition of the triazepentadiene polymer, as solid or as solid in the form of a slurry in a diluent, or as a polymer solution in a solvent, to stirred acylating agent or agents. The reverse addition process where acylating agent is added to the triazapentadiene polymer can also be used. The reactants may also be blended simultaneously in a continuous reactor. Stirring and cooling of the reaction mixture are beneficial for control of heat and for control of polymer properties. The triazapentadiene polymer is preferably handled and added using an inert atmosphere. Also, since it is sensitive to moisture, solvents or liquids used with it should preferably be anhydrous. The reaction is generally complete when the polymer has dissolved in the acylating medium. Reaction completion may be confirmed by drying a sample of the triazine polymer reaction mixture and observing the infrared absorption spectrum which should show a strong absorption band at 1550 cm.$^{-1}$ characteristic for the triazine group and the absence or only trace amounts of C=N absorption at 1700 cm.$^{-1}$. When the reaction is complete the finished polymer may be recovered by precipitation with a non-solvent and filtration or decantation, or by concentration of the reaction mixture and evaporation of diluent from the polymer residue.

The reaction to form the triazine polymer can be carried out in the presence of a diluent. Suitable diluents are dioxane diethylcarbitol, dimethoxyethane, diethylether, acetonitrile, tetrahydrofuran, anisole, chloroanisole, benzonitrile, trichlorotrifluoroethane, methylene chloride, difluorotetrachloroethane, bis(trifluoromethyl)benzene, chlorobenzene, toluene, benzene, xylene, hexane, heptane, mineral spirits, perfluoropyranes, perfluorotetrahydrofurans, and the like.

The triazine polymers of the present invention are thermally stable and are insoluble in all but a few liquids and useful as elastomeric sealants, resins, electrical insulations, damping materials, viscosity modifiers of fluids for use at high temperature, greases, lubricants, hydraulic fluids, and the like. Due to their limited solubility in most organic solvents, they would have utility in processing equipment, and in equipment using fuels and oxidizers. The elastomeric polymers can be fabricated into seals, bladders, diaphragms, coated fabrics, hose, tires, wire coating, gaskets, O-rings, caulks, coatings, and the like.

The preparation of the polytriazapentadiene polymer is prepared by the reaction of a defined dinitrile with ammonia and/or a defined diamidine. The dinitriles employed are perfluoroadiponitrile, perfluorosuberonitrile, perfluorosebaconitrile, and the like. Other dinitriles may also be used where the perhaloalkylene group numbers from four to forty-five perhalomethylene units.

The higher homologous dinitriles or their precursors can be prepared from intermediates which, in turn, can be prepared by known telomerization reaction procedures.

The various longer chain materials are desirable because they permit the synthesis of block polymers having desirable properties in the ultimate triazine polymer over a wide temperature range. Such dinitriles include perfluoroadiponitrile, perfluorosuberonitrile, perfluoropimelonitrile, perfluoroazelanitrile, perfluorosebaconitrile, perfluorododecanedinitrile, perfluorooctadecanedinitrile, perfluorotetracosanedinitrile, perfluorotriacontanedinitrile, perfluorotetracontanedinitrile, and the like. Since maintenance of desirable properties over a wide range of temperature in the end-product triazine polymer is desired, the use of oxa-perfluoroalkylenedinitriles and branched perfluoroalkylenedinitriles which are otherwise very similar to perfluoroalkylenedinitriles are desirable for the polymer synthesis. Such dinitriles include 3-oxa-perfluorosebaconitrile 5,9-dioxa-perfluorotetradecanedinitrile, oxaperfluoropimelonitrile, oxaperfluoroadiponitrile, tetraoxaperfluorotetracosanedinitrile, and penta-oxa-perfluorotriacontanedinitrile.

Branched perfluoroalkylene dinitrile, including perfluoro-3-ethyladiponitrile,
perfluoro-2-ethyladiponitrile,
perfluoro-3-propyladiponitrile,
perfluoro-3-methylpimelonitrile,
perfluoro-4-ethylpimelonitrile,
perfluoro-3-methylsuberonitrile,
perfluoro-4-propylsuberonitrile,
perfluoro-4-methylazelonitrile,
perfluoro-5-butylsebaconitrile,
perfluoro-2-ethyl-3-methyladiponitrile,
perfluoro-3,5-dimethylsuberonitrile,
perfluoro-3,6-diethylsebaconitrile and
perfluoro-3,6-diethyl-9,13-dimethyloctadecanedinitrile are embraced within the starting materials of this invention.

The diamidines employed in this invention are those derived from the above dinitriles and the like. The diamidines are derived from the reaction of the corresponding dinitrile with ammonia, boiling out the excess ammonia, leaving the diamidine behind.

Among the specific triazapentadiene starting compounds or polymers to be used of this invention are:

perfluorotetramethylene bis(perfluoromethyltriazapentadiene),
perfluorohexamethylene bis(perfluoroheptyltriazapentadiene),
poly(perfluorohexamethylenetriazapentadiene),
poly(perfluorotetramethylenetriazapentadiene),
bis(6-cyanoperfluorohexyl) triazapentadiene,
bis(4-cyanoperfluorobutyl)triazapentadiene,
bis(8-cyanoperfluorooctyl)triazapentadiene,
bis(12-cyanoperfluorododecyl)triazapentadiene,
perfluorotetramethylene bis(perfluoropropyltriazapentadiene),
perfluorooctamethylene bis(perfluoropropyltriazapentadiene),
perfluorohexamethylene bis(6-cyanoperfluoroheptyltriazapentadiene),
perfluorotetramethylene bis(4-cyanoperfluorobutyltriazapentadiene),
perfluorooctamethylene bis(8-cyanoperfluorooctyltriazapentadiene),
perfluorododecylene bis(12-cyanoperfluorododecyltriazapentadiene),
poly(perfluoropentamethylenetriazapentadiene),
poly(perfluorohexamethylenetriazapentadiene),
poly(perfluoroheptamethylenetriazapentadiene),
poly(perfluorooctamethylenetriazapentadiene),
poly(perfluorodecamethylenetriazapentadiene),
poly(perfluoroundecamethylenetriazapentadiene),
poly(perfluorododecamethylenetriazapentadiene),
poly(perfluorotridecamethylenetriazapentadiene),
poly(perfluorotetradecamethylenetriazapentadiene), poly(perfluorotetramethyleneperfluorohexamethylene-triazapentadiene),
poly(perfluorotetramethyleneperfluorooctamethylene-triazapentadiene),
bis(5-cyano-oxaperfluoroamyl)triazapentadiene,
bis(4-cyanoperfluoro-2-ethylbutyl)triazapentadiene,
bis(22-cyanoperfluorotetracosamethylene)triazapentadiene.

The block terpolymer:

poly(perfluorohexamethyleneperfluorododecamethyleneperfluorooctadecamethyleneperfluorotetracosamethylene)triazapentadiene,
poly(dioxaperfluorooctamethylene)triazapentadiene, and
poly(oxaperfluoropentamethyleneperfluorotetradecamethylene)triazapentadiene.

Conveniently, a perhaloalkylene dinitrile in a solvent is stirred, and finely divided perhaloalkylene diamidine is added to it continuously or intermittently as the reaction proceeds until the desired degree of polymerization is obtained. Thus, the molecular weight can be controlled to give a monotriazapentadiene compound as the lowest polymer by employing two moles of dinitrile and one mole of ammonia. Higher molecular weight polymers are obtained as the stoichiometry approaches a molar ratio of one to one. The polymerization can also be controlled to produce bis triazapentadienes. It can also be controlled to give higher degrees of polymerization. In fact, substantially any desirable degree of polymerization can be obtained, for the polymerization takes place readily. Thus, the reaction can also be controlled to give a polymer of about 3000 monomer units. Still higher molecular weight polymers can also be obtained, for example, polymers having up to about 100,000 monomer units, and still other polymers containing up to about one million monomer units (wherein $x$ of the foregoing formula is one million).

It is preferred to use pure or substantially pure starting materials in order to reduce the amount of chain termination.

It has been found these dinitriles react to form diamidines when treated with ammonia. To some extent perfluoroadiponitrile forms the cyclo perfluoroadipimidine when treated with ammonia, but since this reacts with perfluoroalkyl nitriles more slowly than diamidines, and since it can be removed from perfluoroadipamidine, linear polymers can be made from it by the processes of this invention. Perfluoroglutaronitrile, perfluorosuccinonitrile and difluoromalononitrile do not give stable diamidines when treated with ammonia, and therefore have limited use in synthesizing linear polymers.

The process to form the triazapentadiene polymer may be carried out between about minus 80 degrees and 120 degrees centigrade, but it conveniently carried out at ambient temperature, i.e., room temperature. Since heat is evolved by the reaction, cooling is desirable to avoid the possibility of vaporization of the dinitrile and reaction occurring out of the liquid reaction zone. At temperatures above about 120 degrees centigrade, the diamidine tends to become unstable and decomposes. At temperatures below minus 80 degrees centigrade, the reaction may become sluggish. The preferred temperature range is between minus 30 and 70 degrees centigrade.

The reaction to form the triazapentadiene polymer is controlled more easily if carried out in the presence of a diluent inert under the conditions of reaction, but no diluent is necessary. Suitable diluents are 1,2-dimethoxyethane, diethylether, acetonitrile, and tetrahydrofuran. Of these, 1,2-dimethoxyethane is the preferred solvent for high molecular weight perfluoroalkylenetriazapentadiene polymers. Other solvents may be used, such as dioxane, diethylcarbitol, anisole, chloroanisole, dimethoxymethane, dimethylsulfoxide, tert.-butanol, non-halogenated nitriles as a class, such as benzonitrile, succinonitrile, glutaronitrile, and acetonitrile; perhalogenated aliphatic solvents such as perfluorokerosene, tetrachloroethylene, methylene chloride, trichlorotrifluoroethane, perfluorotributylamine, difluorotetrachloroethane, fluorotrichloromethane, perfluoropyranes, perfluorotetrahydrofurans, and dibromotetrafluoroethane; certain ester solvents such as methylbenzoate, ethyl acetate, and propyl acetate; as well as other diluent solvent means such as dimethylacetamide, tertiary amyl alcohol, isopropanol, nitromethane, hexafluoroxylene, benzotrifluoride, chlorobenzene, dichlorobenzene, benzene, toluene, xylene, hexane, heptane, octanes, mineral spirits, α-pinene, turpentine, and the like.

It is often advantageous to add finely divided diamidine compound as a solid or a slurry in an inert liquid to a concentrated solution or mixture of a dinitrile compound in reaction liquid. As the triazapentadiene polymer increases in molecular weight and the solution becomes more viscous, additional inert liquid may be added until the desired viscosity and polymer molecular weight is obtained. The progress of the polymerization can be followed by measuring the viscosity and the amount of liquid used. It is preferable to use concentrated solutions since a larger proportion of low molecular weight macrocyclic compounds can be formed in a dilute reaction medium due to intramolecular reaction.

As another special form of triazapentadiene polymer to be used in the invention, the reaction can be controlled to give a monotriazapentadiene compound, illustrated by the formula:

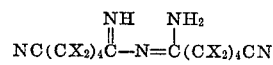

as the major product having two cyanoperhaloalkylene units.

These monotriazapentadiene polymers have the general formula:

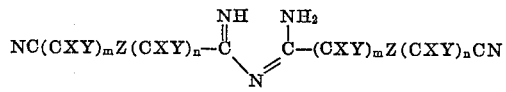

where the divalent group $—(CXY)_mZ(CXY)_n—$ as defined above.

They are prepared by addition of ammonia to excess dinitrile, removing the unreacted dinitrile, to leave the monotriazapentadienedinitrile. These compounds give fluid bis(cyanoperhaloalkylene) triazines which are useful as such, and which may also be used as intermediates for the production of other polymers.

A general formula for the resultant monotriazine polymer of this invention is

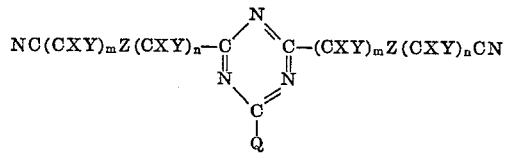

where Q and the difunctional radical

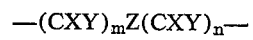

are as defined above.

The triazapentadiene polymer can also be prepared by adding ammonia to the concentrated solution or mixture of the dinitrile compound and inert liquid, instead of adding a diamidine. Dilution may be effected as the molecular weight increases. This technique is especially advantageous for making low molecular weight polymers. Furthermore, the reaction can be carried out by adding the dinitrile in slight excess to a mixture of solid diamidine and inert liquid such as dimethoxyethane. When the low molecular weight polymer formation is complete, further polymerization is carried out by carefully controlled addition of ammonia to the polymer solution until a high molecular weight polymer is obtained.

Another polymerization method may be employed where the diamidine is prepared in situ with dinitrile, solvent and ammonia within the polymerization vessel. The polymerization process may then be effected by the addition of dinitrile to the diamidine and liquid diluent until a high molecular weight polymer is obtained. The polymerization may also be effected by adding dinitrile in slight excess to the diamidine to give lower polymers, then by the further addition of small amounts of ammonia higher polymers are made.

Another polymerization, which gives only the difunctional triazapentadienes, is obtained by reaction of a dinitrile with a monoamidine or by reaction of a diamidine with a mononitrile. An example of this reaction is shown in Equations 9 and 10.

(9)

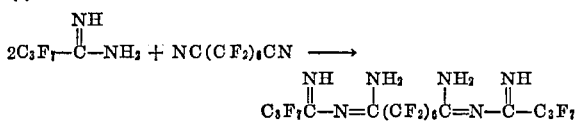

(10)

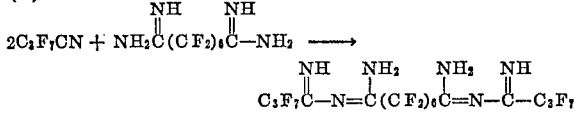

The perhaloorganic portion of the dinitriles and diamidines are defined by the formula

as defined above. The polyhaloorganic portion of the said mononitriles and monoamidines can be the same or different and selected from perhalo lower alkyl and omega-hydro-perfluoroalkyl.

These difunctional triazepentadiene materials can be converted to bis triazinylene compounds by treatment with halogenated acylating agents, described above, and the bis triazine recovered by distillation. These products are useful as fluids. Higher molecular weight triazine polymers and copolymers are prepared by acylating the difunctional triazapentadiene compounds with acid halides of perfluoroalkylene dicarboxylic acids and subsequent treatment with a dehydrating agent. The polymer is recovered by removal of volatile materials under vacuum and drying. In this synthesis, the difunctional

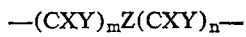

radical of the difunctional triazapentadiene compound and the —(CXY)$_m$Z(CXY)$_n$— of the difunctional acid halide can be the same or different to give, in the ultimate triazine polymer, a homopolymer or a copolymer.

The novel triazapentadiene polymers are not thermally stable as such above about 120 degrees centigrade, but when treated as described herein, they are converted to soluble, thermally stable poly(perhaloalkylenetriazine) polymers, useful as gaskets, seals, sealants, O-rings, bladders, tires, hose, greases, lubricants, hydraulic fluids, wire insulation, and the like.

It has been discovered that polymeric chains having nitrile terminal groups react with other polymeric chains having amidine terminal groups to give polymeric chains of higher molecular weight. It has also been discovered that the perhaloalkylene radical of the nitriles or amidines used need not be alike in all reacting species. Thus, for example, one particular perfluoroalkylene dinitrile may be reacted with a diamidine prepared from a different perfluoroalkylene dinitrile to give a copolymer. The process can also be effected with yet a third dinitrile or diamidine having yet a different type of perfluoroalkylene group to give a terpolymer, and so on, providing only that the proper dinitrilediamidine stoichiometry is maintained.

In addition, low molecular weight polymers containing one kind of perhaloalkylene radical in the chain can be reacted with other low molecular weight polymers containing a different type of perhaloalkylene radical in the chain to give block polymers which are different from those described above.

Triazapentadiene copolymers, terpolymers, and/or block polymers can be connected to triazine copolymers, terpolymers, and/or block polymers by the processes described above.

As another special form of polymer, this invention includes the use of the bis(triazapentadienes) as starting materials of the type illustrated by the following compound:

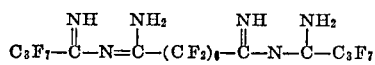

perfluorohexamethylene bis(perfluoropropyltriazapentadiene)

It has been found that only those bis(triazapentadienes) whose perhaloalkylene chain lengths are at least four carbons in length, or four atoms equivalent in length to form carbon atoms, are stable. That is, for instance, there is no bis(triazapentadiene) compound from perfluoroglutaronitrile and perfluorobutyramidine, but another isomeric composition is formed instead, which may have the following structure:

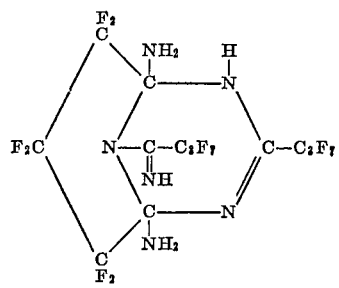

It has been found that perfluoroadiponitrile and perfluorobutyramidine form a triazapentadiene of intermediate stability and this also isomerizes on standing to another composition which may have the following structure:

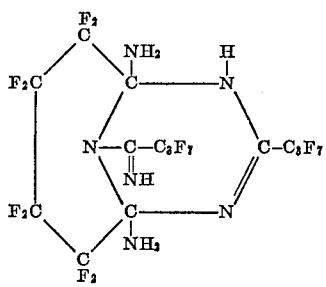

likewise, an isomeric composition is formed from reacting perfluorosuccinonitrile with perfluorobutyramidine, which may have the following structure:

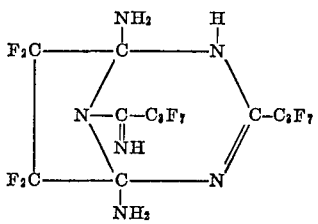

However, stable bis(triazapentadienes) are made by reaction of perfluorosuberonitrile with perfluorooctanamidine (perfluorocaprylamidine), which was stable for at least one year. There is also a stable bis(triazapentadiene) formed from perfluoroadiponitrile and perfluorocaprylamidine. Other stable bis(triazapentadiene) compounds have been prepared from reaction of perfluorosuberamidine with perfluorobutyramidine, and from perfluorosebacamidine with perfluorobutyronitrile and with perfluorocaprylonitrile.

Perfluorosuccinonitrile did not give crystalline compounds when reacted with either perfluorobutyramidine or perfluorocaprylamidine, but oils instead. Thus, the lower molecular weight adducts are not stable triazapentadienes, but the higher ones are.

A general formula for such bis(triazine) polymers of this invention is

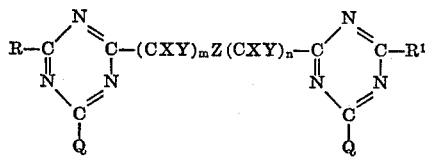

where R and $R^1$ are each selected from perhalo lower alkyl and omega-hydro-perfluoro lower alkyl, and Q and the difunctional radical $—(CXY)_mZ(CXY)_n—$ are as defined above.

Polymers in which the difunctional polyhaloorganic triazapentadiene radicals are distributed in random order are obtained by reaction of a mixture of dinitriles with diamidines or a mixture of diamidine in a molar ratio approaching 1:1. A similar polymer is obtained by reaction of a mixture of dinitriles with ammonia in a molar ratio approaching 1:1. Comonomers in addition to the above-defined dinitriles may be used with the above-defined dinitriles and diamidines.

Thus, a number of different polytriazapentadiene polymers can be prepared in which the type of perhaloalkylene radicals can be connected in the chains in repeating, alternating or in random order, or in blocks or the like radicals, depending on the nature of the reacting species and the order in which they are permitted to react and, again, providing the proper dinitrile-diamidine and/or dinitrile-ammonia stoichiometry be maintained. These can then be converted to a corresponding triazine polymer.

The following examples will further illustrate the nature of the present invention; however, the invention is not intended to be limited to these examples. Parts are by weight and temperatures in degrees centigrade unless otherwise indicated.

EXAMPLE 1

Preparation of poly(perfluorotetramethylenetriazapentadiene) followed by conversion to poly(perfluorotetramethyleneperfluoropropyltriazine)

To perfluoroadipamidine, 0.429 gram, in a 50 milliliter round-bottomed flask containing a magnetic stirrer, was added perfluoroadiponitrile, 0.397 gram, and acetonitrile, 5.5 milliliters. The mixture was stirred and allowed to warm to ambient temperature, 25 degress centigrade. In two hours the mixture was homogeneous. The solution was concentrated to a residue which was dried under vacuum.

The perfluorotetramethylenetriazapentadiene polymer residue had a reduced viscosity of 0.02 at 0.5 gram per deciliter in tetrahydrofuran.

Conversion to triazine polymer with perfluorobutyric anhydride gave poly(perfluorotetramethyleneperfluoropropyltriazine), a viscous grease with a characteristic triazine absorption band at 1550 cm.$^{-1}$.

EXAMPLE 2

Preparation of poly(perfluorohexamethylenetriazapentadiene) and conversion to poly(perfluorohexamethyleneperfluoropropyltriazine)

To perfluorosuberamidine, 11.248 grams, and tetrahydrofuran, 30 milliliters, in a 100 milliliter round-bottomed flask at zero degrees centigrade was added perfluorosuberonitrile, 10.25 grams, in 75 minutes. The mixture was allowed to warm to room temperature and was stirred for five days. A sample was dried under vacuum, and the perfluorohexamethylenetriazapentadiene polymer obtained was found to have an intrinsic viscosity of 0.35 deciliter per gram in tetrahydrofuran, and a molecular weight of 37,000, and had the appearance of a white rubbery gum.

The polymer was converted by reaction with excess perfluorobutyric anhydride to the corresponding triazine polymer which had a molecular weight of 33,000.

EXAMPLE 3

Preparation of poly(perfluorohexamethylenetriazapentadiene) and conversion to poly(perfluorohexamethyleneperfluoropropyltriazine)

To 23.5 grams of perfluorosuberonitrile and 17 milliliters of 1,2-dimethoxyethane in the nitrogen atmosphere at zero degrees centigrade, ammonia was added with stirring. When 980 milliliters of ammonia had been consumed, 20 milliliters more of 1,2-dimethoxyethane were added. When 1100 milliliters of ammonia had been consumed, 22 milliliters of 1,2-dimethoxyethane was added. After 1320 milliliters of ammonia had been consumed, 10 milliliters more of 1,2-dimethoxyethane were added. When 1374 milliliters of ammonia had been added, the reaction was considered finished, for the solution was partially gelled. The recovered perfluorohexamethylenetriazapentadiene polymer had an intrinsic viscosity of 0.355 deciliter per gram in 1,2-dimethoxyethane.

A similar reaction gave a poly(perfluorohexamethylenetriazapentadiene) product of intrinsinc viscosity 0.13 deciliter per gram in 1,2-dimethoxyethane. Conversion by the process of Example 1, gave a triazine polymer having an intrinsic viscosity of 0.51 deciliter per gram in hexafluoroxylene.

Using the method of Example 3 by substituting perfluorooxapimelonitrile for perfluorosuberonitrile there can be obtained the corresponding poly(perfluorooxapentamethylenetriazapentadiene), which can then be converted to the corresponding triazine polymer withomegahydroperfluoropentanoic anhydride to poly(perfluorooxapentamethyleneomega - hydroperfluorobutyltriazine). By substituting perfluoroethyladiponitrile for perfluorosuberonitrile there can be obtained poly(perfluoroethyltetramethylenetriazapentadiene, which can then be converted to the corresponding triazine polymer with perfluoroethoxyethoxyethoxyacetyl fluoride to poly(perfluoro - ethyltetramethyleneperfluoroethoxyethoxyethoxymethyltriazine). By substituting perfluorotetradecane dinitrile for perfluorosuberonitrile there can be obtained poly-(perfluorododecamethylenetriazapentadiene), which can then be converted to the corresponding triazine polymer with omega-hydroperfluoropropionic anhydride to poly-(perfluorodecamethylene - omega - hydroperfluoroethyltriazine).

EXAMPLE 4

Preparation of poly(perfluoropropylcyanoperfluoropropylperfluorohexamethlenetriazine) and vulcanization thereof A poly(perfluorohexamethylenetriazapentadiene) polymer was prepared by the addition of perfluorosuberamidine to perfluorosuberonitrile in 1,2-dimethoxyethane. A polymer of intrinsic viscosity 0.9 deciliter per gram was obtained. The polymer, in dimethoxyethane solution, 65 grams (13.7 percent by weight of polymer), was added from an addition funnel with stirring to a mixture of perfluorobutyric anhydride, 72 grams, and 4-cyanoperfluorobutyryl chloride, 28 grams, in a closed round-bottomed flask, which was vented occasionally to release hydrogen chloride which was formed as a by-product. The mixture was stirred 30 minutes, then the volatile materials were removed by vacuum distillation to 150 degrees centigrade at 0.1 millimeter of mercury. A sample of the recovered poly (perfluoropropylcyanoperfluoropropylperfluorohexamethylenetriaizne) polymer, 2.5 grams (reduced viscosity, 0.25 at 0.3348 gram per deciliter), was milled with silver oxide, 0.25 gram, and molded at 130 to 160 degrees centigrade. The molded specimen had a tensile strength of 1030 pounds per square inch at 75 percent elongation and was vulcanized.

The 4-cyanoperfluorobutyryl chloride used in the above example is believed to be a new composition of matter, and separately claimed in Ser. No. 573,195, filed Aug. 18, 1966, now U.S. Patent 3,349,105.

EXAMPLE 5

Preparation of poly(perfluorotetramethyleneperfluorohexamethylenetriazapentadiene) and conversion to poly-(perfluorotetramethyleneperfluorohexamethylenetriazine)

To perfluoroadiponitrile, 16.5 grams, and 1,2 - dimethoxyethane, 35 milliliters, was added perfluorosuberamidine, 26.3 grams.

The addition was made during 24 hours, and additional dimethoxyethane, 45 milliliters, was added in portions during the reaction. The polymer had an infrared absorption spectrum typical of the triazapentadiene structure.

The triazapentadiene polymer, 25 grams in dimethoxyethane, was added with stirring to perfluorobutyric anhydride, 82 grams, in a period of two hours at 25 to 30 degrees centigrade. The polymer was recovered by vacuum distillation of the volatile material and vacuum drying of the residue. The poly(perfluorotetramethyleneperfluorohexamethylenetriazine polymer recovered had a reduced viscosity of 0.01 gram per deciliter and had infrared absorption at 6.4 microns, characteristic of the triazine group.

EXAMPLE 6

Preparation of perfluoroheptyl bis(perfluorooctamethyleneperfluoromethyltriazine)

Perfluorooctamethylene - bis(perfluoroheptyltriazapentadiene), 5 grams, was added to trifluoroacetic anhydride, 45 milliliters, and stirred for 18 hours. The volatile material was then removed at 30–100 degrees centigrade at 0.2 millimeter of mercury vacuum. The residue was then distilled to yield perfluorooctamethylene - bis(perfluoroheptylperfluoromethyltriazine) having a boiling point of 169 degrees centigrade at 0.25 millimeter mercury vacuum.

The infrared absorption spectrum of the distillate had a triazine absorption band at 6.4 microns.

*Analysis.*—Calculated for $C_{30}F_{52}N_6$ (percent): N, 7.42. Found (percent): N, 6.8.

EXAMPLE 7

Preparation of bis(cyanoperfluorohexamethylene)triazapentadiene and conversion to 2,4-bis(cyanoperfluorohexyl)-6-trifluoromethyltriazine To perfluorosuberonitrile, 27 parts, at zero degrees centigrade were added ammonia gas, 0.26 part, with stirring, during five days. The unreacted dinitrile, 16 parts was recovered by vacuum distillation. The residue was sublimed giving white solid 2,4-bis(cyanoperfluorohexyl) triazapentadiene, 3 parts, melting point 37.5 degrees centigrade, with infrared absorption bands at 1525, 1600, 1650 and 2250 reciprocal centimeters.

*Analysis.*—Calculated for $C_{16}H_3F_{24}N_5$ (percent): C, 26.64; H, 0.42; F, 63.23; N, 9.71. Found (percent): C, 26.66; H, 0.79; F, 63.36; N, 9.45.

To 4.0 grams of 2,4-bis(cyanoperfluorohexyl)-1,3,5-triazapentadiene was added 10 milliliters of trifluoroacetic acid anhydride with stirring. The volatile components were evaporated and the residue distilled to give 3.0 grams of an oil having a boiling point of 85 degrees centigrade at 0.075 millimeters of mercury, and an index of refraction at $n_D^{25}$ 1.3370, with characteristic infrared absorption bands at 1150–1250, 1430, 1550 and 2250 reciprocal centimeters.

*Analysis.*—Calculated for $C_{18}F_{27}N_5$ (percent): C, 27.05; F, 64.19; N, 8.76. Found (percent): C, 26.98; F, 63.63; N, 9.22.

Using the method of Example 7 but substituting perfluorooxapimelonitrile for perfluorosuberonitrile there can be obtained the corresponding bis(cyanooxaperfluoroamyl)triazapentadiene which can be converted with perfluoropropionic anhydride to the corresponding 2,4-bis-(cyanoperfluorooxaamyl) - 6 - perfluoroethyltriazine. By substituting perfluoroethyladipontrile for perfluorosuberonitrile there can be obtained bis(cyanoperfluoroethylbutyl)triazapentadiene, which can be converted with omega-hydroperfluoropentanoic anhydride to the corresponding 2,4 - bis(cyanoperfluoroethylbutyl) - 6 - omega-hydroperfluorobutyltriazine. By substituting perfluorotetradecane dinitrile for perfluorosuberonitrile there can be obtained bis ( cyanoperfluorotridecyl ) triazapentadiene which can be converted with perfluorooctanoic anhydride to the corresponding 2,4-bis(cyanoperfluorotridecyl)-6-perfluoroheptyltriazine.

EXAMPLE 8

Preparation of poly(perfluorooctamethyleneperfluoropropyltriazine) containing cyanoperfluoropropyl groups To 10 parts of poly(perfluorooctamethylenetriazapentadiene), having an intrinsic viscosity of 0.14 deciliter per gram, in 37 parts of tetrahydrofuran was added with stirring 0.72 part of 4-cyanobutyryl chloride. To this mixture 77 parts of perfluorobutyric anhydride was then added. The product poly(perfluorooctamethyleneperfluoropropyltriazine) was recovered by distillation of volatile material and drying of the residue at 150 degress centigrade. The product weighed 9.6 parts and contained free nitrile groups as shown by an infrared absorption analysis.

EXAMPLE 9

Preparation of poly(perfluorohexamethylene-6-cyanoperfluoropropyltriazine)

To poly(perfluorohexamethylenetriazapentadiene), 20 parts, dissolved in tetrahydrofuran was added 116 parts of 4-cyanoperfluorobutyryl chloride in 30 minutes at zero degrees centigrade with stirring. The mixture was stirred for 26 hours at zero to 20 degrees centigrade. The polymer was recovered by distillation of the solvent and volatile by-products, and drying of the residue at 100 degrees centigrade under vacuum. Infrared adsorption analysis showed the presence of nitrile absorption at 2250 cm.$^{-1}$ and triazine absorption at 1550 cm.$^{-1}$.

EXAMPLE 10

Preparation of nitrile-terminated poly(perfluorohexamethyleneperfluoropropyltriazine)

To poly(perfluorohexamethylenetriazapentadiene), 22.3 parts, and 100 parts of dimethoxyethane, was added 0.125 part of perfluorosuberonitrile. The solution was stirred for 16 hours, then added with stirring to 292 parts of perfluorobutyric anhydride in 60 minutes at 10 to 15 degrees centigrade. The mixture was stirred 20 hours at 25 degrees centigrade and the product, poly(perfluorohexamethyleneperfluoropropyltriazine) was recovered as in the previous examples.

EXAMPLE 11

Preparation of poly(perfluorohexamethyleneperfluoroheptyltriazine)

A solution of triazapentadiene polymer, 5 milliliters, containing poly (perfluorohexamethylenetriazapentadiene), 3.6 grams, molecular weight 33,000, in tetrahydrofuran solvent was added to 20 milliliters of perfluorooctanoic anhydride with stirring in a 100 milliliter resin flask. The poly(perfluorohexamethylenetriazapentadiene) thereby obtained was recovered by vacuum drying. It had an intrinsic viscosity of 0.23 deciliter per gram in ethyl perfluorobutyrate.

EXAMPLE 12

Preparation of poly(perfluorooctamethylenetriazine) and conversion to poly(perfluorooctamethylenetrifluoromethyltriazine)

A round bottom flask was fitted with a gas inlet tube, a gas bubble counter in the inlet line, and a magnetic stirrer. In it a solution of perfluorosebaconitrile, 15 grams, and 32 milliliters of tetrahydrofuran was kept saturated with anhydrous ammonia for two hours. Condensation products of ammonia and the dinitrile were thereby formed as intermediates, which broke down in the presence of excess ammonia to give perfluorosebacamidine as a white solid which precipitated out as perfluorosebacamidine. More perfluorosebaconitrile, 15 grams, was then added until the solid perfluorosebacamidine was all consumed, as evidenced by its being dissolved. A sample was removed for analysis. The infrared absorption spectrum showed a nitrile peak at 4.35 microns. Ammonia was then added in small volumes until the nitrile absorption peak disappeared and the solution became viscous. A sample was dried under vacuum to give a slightly tacky residue of intrinsic viscosity of 0.38 deciliter per gram.

A portion of the poly(perfluorooctamethylenetriazapentadiene) solution described above was added slowly to a 20-fold excess of trifluoroacetic anhydride in 40 minutes and stirred for two hours afterwards, then sealed and allowed to stand for 18 hours, all at 25 degrees centigrade. The solution was then filtered through a coarse, sintered glass funnel, the infrared absorption smear showed the absence of unreacted imidoylamidine. The solution was concentrated and evaporated under vacuum to a bath temperature of 220 degrees centigrade, leaving poly(perfluorooctamethylenetrifluoromethyltriazine) which did not flow at this temperature. The intrinsic viscosity in ethyl perfluorobutyrate was 0.55 deciliter per gram. The infrared absorption spectrum showed a small to medium amide carbonyl impurity band at 5.7 microns.

EXAMPLE 13

Preparation of poly(perfluorooctamethyleneperfluoropropyltriazine)

Using perfluorobutyric anhydride instead of perfluoroacetic anhydride as in the example immediately above, a similar polymer, poly(perfluorooctamethyleneperfluoropropyltriazine) was prepared which had an intrinsic viscosity of 0.403 deciliter per gram.

EXAMPLE 14

Preparation of triazine polymer from perfluorohexamethylene bis(perfluoroheptyltriazapentadiene) and perfluoroadipyl chloride To a partially dissolved suspension of 7.26 grams of perfluorohexamethylene bis(perfluoroheptyltriazapentadiene), having a melting point of 115 to 116 degrees centigrade, in 50 milliliters of bis(trifluoromethylbenzene) at minus 10 to zero degrees centigrade, was added 2.013 grams of perfluoroadipyl chloride. The solution was then stirred for another 30 minutes and then stirred for 16 hours at minus 20 to 5 degrees centigrade. The intermediate polymer salt was a thixotropic gel with the solvent. The gel was taken up in a syringe and added to excess (100 grams) of perfluorobutyric anhydride at minus 10 to minus 78 degrees centigrade in 30 minutes. After 16 hours at room temperature, the viscous residue was distilled under vacuum to a bath temperature of 200 degrees centigrade. The reduced viscosity was 0.03 gram per deciliter. The infrared spectrum contained a strong triazine absorption band.

EXAMPLE 15

Preparation of poly(perfluorohexamethyleneperfluoropropyltriazine) and poly(perfluorohexamethyleneperfluoroheptyltriazine)

To 156 grams of perfluorobutyric anhydride at zero degrees centigrade was added with stirring 10 grams (in 36 milliliters of tetrahydrofuran solution) of poly(perfluorohexamethylenetriazapentadiene) within two hours. The solution was stirred for an additional hour at zero degrees centigrade and then allowed to warm to 25 degrees centigrade and stirred for 17 hours. The volatile compounds were then distilled under 0.1 millimeter mercury vacuum, and the residue heated to dryness to 200–230 degrees centigrade at 0.1 millimeter of mercury for 20 hours. The poly(perfluorohexamethyleneperfluoroheptyltriazine) residue was a rubbery polymer, soluble in ethylperfluorobutyrate, and perfluoroacid anhydrides, and perfluoroalkyltriazines. The intrinsic viscosity of the polymer was 0.24 deciliter per gram.

By a similar process, poly(perfluoroheptylperfluorohexamethylenetriazine) polymer of the same approximate molecular weight was also made, by the reaction of perfluorooctanoic anhydride with poly(perfluorohexamethylenetriazapentadiene).

EXAMPLE 16

Preparation of poly(perfluorohexamethylenetriazapentadiene) and conversion to poly(perfluoropropylperfluorohexamethylenetriazine)

Perfluorosuberamidine (1.9740 grams), having a melting point of 188 to 190 degrees centigrade in 6 milliliters of anhydrous tetrahydrofuran was stirred magnetically in 50 milliliters round bottom flask in an ice bath. To this was added 1.747 grams of perfluorosuberonitrile in one minute, and the solution was stirred in ice for 17 hours. Particles of amidine were still observed, so additional nitrile was added until about 12 percent excess over the theoretical amount was consumed. The amidine was then completely dissolved. A sample of the product was removed for analysis. A small band at 4.35 microns in the infrared spectrum of the reaction mixture sample was observed, indicating the presence of excess nitrile groups. It was suspected that the unpurified amidine used had retained some free ammonia. A sample of the solution was dried under vacuum and gave poly(perfluorohexamethylenetriazapentadiene), an inelastic film. The solid triazapentadiene had an intrinsic viscosity in tetrahydrofuran of 0.36 deciliter per gram. The number average molecular weight in tetrahydrofuran by membrane osmometry was 37,000. Differential thermal analysis showed endotherms at 125 degrees and 186 degrees centigrade identified as melting and decomposition respectively in a melting point apparatus.

One-half of the above solution was added to 50 milliliters of perfluorobutyric anhydride at zero degrees centigrade. The solution became homogeneous in one minute and was allowed to stir overnight at 25 degrees centigrade. The volatile compounds were removed under vacuum at 150 degrees centigrade and 0.1 millimeter of mercury for 24 hours, then at 200 degrees centigrade for 17 hours. The product, poly(perfluoropropylperfluorohexamethylenetriazine) was soluble in perfluorobutyric anhydride, perfluoropropyltriazine, and in ethyl perfluorobutyrate. It was partially soluble in acetone, methylethyl ketone and ethyl acetate; insoluble in nitromethane, acetonitrile, ethyl acetoacetate, trimethyl phosphate, trichloroethylene, sulfolane(tetrahydrothiophene-1,1-dioxide), and dimethylsulfoxide. The infrared absorption spectrum was free of absorption in the 3 micron and 5.5–6.3 micron regions indicating absence of carbonyl and imino groups. A strong triazine band at 6.4 microns was observed. A vapor phase osmometry measurement in ethyl perfluorobutyrate indicated that the molecular weight was about 30,000. The intrinsic viscosity in the same solvent was 0.24 deciliter per gram. The polymer was a tacky, rubbery material which flowed slightly during 24 hours.

EXAMPLE 17

Poly(perfluoroheptylperfluorohexamethylenetriazine)

The remaining half of the solution described initially above in Example 13 was added to 20 milliliters of perfluorooctanoic anhydride and the triazine polymer recovered as in Example 13. The intrinsic viscosity was found to be 0.23 deciliter per gram in ethyl perfluorobutyrate. This polymer had physical properties similar to the polymer described in the paragraph immediately above.

EXAMPLE 18

Preparation of poly(perfluorocarboxypropylperfluoropropylperfluorooctamethylenetriazine)

To 72 milliliters of a solution containing poly(perfluorooctamethylenetriazapentadiene), 18.7 grams, in dimethoxyethane were added at once 0.97 gram of perfluoroglutaric anhydride. After stirring two and one-half hours at zero degrees centigrade, 78.4 grams of perfluorobutyric anhydride were rapidly added. After stirring 17 hours at room temperature, the triazine polymer, 23.2 grams, was recovered by vacuum drying. In addition to the usual infrared bands for the triazine polymer, it had a strong band at 1765 cm.$^{-1}$ characteristic of the perfluorocarboxylic acid carbonyl. The tough rubbery material was incompletely soluble in ethyl perfluorobutyrate indicating some cross-linking had occurred.

EXAMPLE 19

Preparation of copolymer poly(perfluorohexamethyleneperfluorooctamethylenetriazapentadiene) and conversion to poly(perfluoropropylperfluorohexamethyleneperfluorooctamethylenetriazine)

To 10.5 grams of perfluorosuberonitrile, in 10 milliliters of dimethoxyethane, was added 6.72 grams of perfluorosebacamidine and perfluorosuberamidine (30:70 by weight mixture) in 48 hours with stirring in a nitrogen gas atmosphere at room temperature. Then 5 milliliters of dimethoxyethane were added. In the next 48 hours, 2.39 grams more of perfluorosuberamidine were added, and 15 milliliters more dimethoxyethane. The temperature was then raised to 50 to 55 degrees centigrade and perfluorosuberamidine and dimethoxyethane were added in portions intermittently during 18 days until 11.55 grams of amidine and 95 milliliters of dimethoxyethane had been added. The resultant triazapentadiene copolymer had an intrinsic viscosity in dimethoxyethane of 1.0 deciliter per gram.

The resultant triazapentadiene polymer, 21 grams as a 30.8 percent solution in dimethoxyethane by weight, was placed in a flask with a stirrer and 100 millilters of additional dimethoxyethane were added. The diluted polymer solution was then added to 272 grams of perfluorobutyric anhydride at 15 degrees centigrade in 55 minutes. After 10 minutes more at 15 degrees centigrade, the mixture was warmed to 25 degrees centigrade. The solution was then distilled and the residue was dried to 150 degrees centigrade at 0.05 millimeter of mercury. The resultant triazine polymer had a reduced viscosity of 0.25 at 0.2744 gram per deciliter in hexafluoroxylene. The infrared absorption spectrum indicated a pure triazine polymer.

EXAMPLE 20

Preparation of poly(perfluoroalkylenetriazine) vulcanizate

A poly(perfluorohexamethylenetriazapentadiene) polymer was prepared by the addition of perfluorosuberamidine to perfluorosuberonitrile in 1,2-dimethoxyethane. A polymer of intrinsic viscosity 0.9 deciliter per gram was obtained. The polymer, in dimethoxyethane solution, 65 grams (13.7 percent by weight of polymer), was added from an additional funnel with stirring to a mixture of perfluorobutyric anhydride, 72 grams and 4-cyanoperfluorobutyryl chloride, 28 grams, in a closed round-bottomed flask, which was vented occasionally to release hydrogen chloride which was formed as a by-product. The mixture was stirred 30 minutes, then the volatile materials were removed by vacuum distillation to 150 degrees centigrade at 0.1 millimeter of mercury. A sample of the recovered triazine polymer, 2.5 grams (reduced viscosity, 0.25 at 0.3348 gram per deciliter) was milled with silver oxide, 0.25 gram, and molded at 130 to 160 degrees centigrade. The molded specimen had a tensile strength of 1030 pounds per square inch at 75 percent elongation and was vulcanized.

EXAMPLE 21

Preparation of perfluorohexamethylene bis(perfluoroheptyltriazapentadiene) and conversion to poly(perfluorohexamethyleneperfluoroheptyltriazine)

To a slurry of 11.70 grams (0.0284 mole) in 40 milliliters of anhydrous FC-75 Solvent (containing perfluoroalkylpyrans), 4.95 grams (0.0141 mole) of perfluorosuberonitrile was added in two hours and the mixture then stirred for 18 hours. The solid product was then filtered, recrystallized twice from benzene, and dried under vacuum, melting point 115–116 degrees centigrade. The melting point was rechecked after twelve months and found to be the same.

*Analysis.*—Calculated for $C_{24}H_6F_{42}N_6$ (percent): C, 24.50; H, 0.51; F, 67.84; N, 7.15. Found (percent): C, 24.68; H, 0.66; F, 67.32; N, 6.95.

In tetrahydrofuran, the compound had ultraviolet maxima at 257 millimicrons (E=16,000) and at 320 millimicrons (E=1,610). The infrared spectrum had absorption bands at 2.9, 3.0, 6.1 and 6.3 microns, typical for a triazapentadiene structure.

EXAMPLE 22

Preparation of perfluorohexamethylene bis(perfluoroheptyltriazapentadiene)

To a slurry of 11.70 grams (0.0284 mole) in 40 milliliters of anhydrous FC-75 Solvent (containing perfluoroalkylpyrans), 4.95 grams (0.0141 mole) of perfluorosuberonitrile was added in two hours and the mixture then stirred for 18 hours. The solid product was then filtered, recrystallized twice from benzene, and dried under vacuuum. Melting point 115–116 degrees centigrade. The melting point was rechecked after twelve months and found to be the same.

*Analysis.*—Calculated for $C_{24}H_6F_{42}N_6$ (percent): C, 24.50; H, 0.51; F, 67.84; N, 7.15. Found (percent): C, 24.68; H, 0.66; F, 67.32; H, 6.95.

In tetrahydrofuran, the compound had ultraviolet maxima at 257 millimicrons (E=16,000) and at 320 millimicrons (E=1,610). The infrared spectrum had absorption at 2.9, 3.0, 6.1 and 6.3 microns, typical for a triazapentadiene structure.

A suspension of perfluorohexamethylene bis(perfluoroheptyltriazapentadiene) in 50 milliliters of bis(trifluoromethyl) benzene at minus 10 to zero degrees centigrade was added 2.01 grams of perfluoroadipyl chloride. The mixture was stirred for 30 minutes, and then added to 100 grams of perfluorobutyric anhydride at minus 10 to minus 78 degrees centigrade in 30 minutes. The product poly(perfluorohexamethyleneperfluorotetramethyleneperfluoroheptyltriazine), was recovered by distilation of the volatile compounds remaining and drying under vacuum at 200 degrees centigrade. The polymer had an intrinsic viscosity of 0.03 deciliter per gram. The infrared spectrum showed the characteristic triazine absorption.

As many widely different embodiments of this invention may be made without departing from the spirit and scope

We claim:

1. A linear or essentially linear triazine consisting essentially of repeating units of the formula:

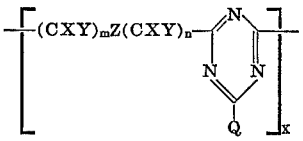

wherein X is fluorine, each Y is selected from halogen and perhalo lower alkyl, x is from one to 3000,

is a divalent polyperfluorooxyalkylene radical where each alkylene unit has from 2 to 10 carbon atoms and the units are from 2 to 35 in number, and each Q is a halogenated organic pendant group selected from the group consisting of halo lower alkyl and substituted halo lower alkyl where the substituents are chosen from alkoxycarbonyl-, carbamoyl-, carboxy-, haloformyl-, nitro-, nitroso, dialkoxy phosphonate-, perhalo lower alkoxy-, aryl-, halogenated aryl-, cyano-, perhalo lower alkene, and perhalo lower alkyne, perfluoro lower alkyl polyoxyalkylene where each alkylene unit has from 2 to 10 carbon atoms and the units are from one to 35 in number; said triazine having terminal groups individually selected from the group consisting of nitrile, amidine, prehaloalkyl, omega-hydroperhaloalkyl, alkyl imidate, acylated alkyl imidate, thio alkyl esters, thio aryl esters, thiol alkyl esters, thiol aromatic esters, alkyl, perhaloalkene, perhaloalkyne, aryl, lower alkyl ester, aryl ester, carbourea and lower acylated amidine groups.

2. A linear or essentially linear triazine consisting essentially of repeating units of the formula:

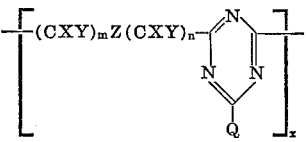

wherein each X is selected from chlorine and fluorine, each Y is selected from halogen and perhalo lower alkyl, m and n are positive integers greater than zero, x is from one to 3000, —(CXY)$_m$Z(CXY)$_n$— divalent polyhalo organic radical having 4 to 45 carbon atoms, Z is selected from at least one of perhalo lower alkylene, perhalo lower alkylidene, omega-hydroperhalo lower alkylidene, keto, oxy, thio, sulfoxide, sulfone,

wherein R is perhalo lower alkyl or omega-hydroperfluoro lower alkyl, poly-perfluorooxyalkylene where each alkylene unit has form two to ten carbon atoms, poly(perfluoroalkylenedioxy) where each alkylene unit has from 2 to 10 carbon atoms, perfluoroalkylenedioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl and Q is a cyano-halo lower alkyl, where the halogens are selected from chlorine, bromine, fluorine and iodine; said triazine having terminal groups individually selected from the group consisting of nitrile, amidine, perhaloalkyl, omega-hydroperhaloalkyl, alkyl imidate, acylated alkyl imidate, thio alkyl esters, thio aryl esters, thiol alkyl esters, thiol aromatic esters, alkyl, perhaloalkene, perhaloalkyne, aryl, lower alkyl ester, aryl ester, carbourea and lower acylated amidine groups.

3. A linear or essentially linear triazine consisting essentially of repeating units of the formula:

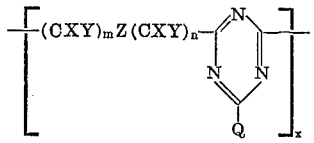

wherein each X is selected from chlorine and fluorine, each Y is selected from halogen and perhalo lower alkyl, m and n are positive integers greater than zero, x is from one to 3000, —(CXY)$_m$Z(CXY)$_n$— is a divalent polyhalo organic radical having 4 to 45 carbon atoms, Z is selected from at least one of perhalo lower alkylene, perhalo lower alkylidene, omega-hydroperhalo lower alkylidene, keto, oxy, thio, sulfoxide, sulfone,

wherein R is perhalo lower alkyl or omega-hydroperfluoro lower alkyl, poly-perfluorooxyalkylene where each alkylene unit has from two to ten carbon atoms, poly(perfluoroalkylenedioxy) where each alkylene unit has from 2 to 10 carbon atoms, perfluoroalkylenedioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl and Q is a carboxy-halo lower alkyl wherein the halogens are selected from chlorine, bromine, fluorine and iodine; said triazine having terminal groups individually selected from the group consisting of nitrile, amidine, perhaloalkyl, omega-hydroperhaloalkyl, alkyl imidate, acylated alkyl imidate, thio alkyl esters, thio aryl esters, thiol alkyl esters, thiol aromatic esters, alkyl, perhaloalkene, perhaloalkyne, aryl, lower alkyl ester, aryl ester, carbourea and lower acylated amidine groups.

4. The triazine polymer of claim 2 wherein Q is 4-cyano perfluoropropyl.

5. The triazine polymer of claim 3 wherein Q is carboxy perfluoropropyl.

6. The method of producing a linear or essentially linear triazine polymer containing at least one triazine group which method consists essentially of converting a triazapentadiene polymer to the corresponding triazine polymer by a halogenated acylating and dehydrating agent and recovering the product so produced, wherein said triazapentadiene polymer is of the formula:

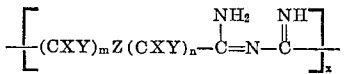

wherein x is from two to 3000, each X is selected from chlorine and fluorine, each Y is selected from halogen and perhalo lower alkyl, m and n are positive integers greater than zero, —(CXY)$_m$Z(CXY)$_n$— is a divalent polyhalo organic radical having 4 to 45 carbon atoms, and Z is selected from at least one perhalo lower alkylene, perhalo lower alkylidene, omega-hydroperhalo lower alkylidene, keto, oxy, thio, sulfoxide, sulfone,

wherein R is perhalo lower alkyl and omega-hydroperfluoro lower alkyl, poly-perfluorooxyalkylene wherein each alkylene unit has from two to ten carbon atoms, poly(pefluoroalkylenedioxy) wherein each alkylene unit has from 2 to 10 carbon atoms, perfluoroalkylenedioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl.

7. The method of claim 6 which comprises producing copolymer which method consists essentially of reacting a triazapentadiene polymer consisting essentially of at least one triazapentadiene unit of the formula:

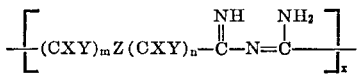

wherein each X is selected from chlorine and fluorine, each Y is selected from halogen and perhalo lower alkyl, $m$ and $n$ are positive integers greater than zero, $x$ is from one to 3000. —(CXY)$_m$Z(CXY)$_n$— is a divalent polyhalo organic radical having 4 to 45 carbon atoms, Z is selected from at least one perhalo lower alkylene, perhalo lower alkylidene, omega-hydroperhalo lower alkylidene, keto, oxy, thio, sulfoxide, sulfone,

wherein $x$ is from two to 3000, etach X is selected from omega-hydroperhalo lower alkyl, poly-perfluorooxyalkylene where each alkylene unit has from two to ten carbon atoms, poly(perfluoroalkylenedioxy) where each alkylene unit has 2 to 10 carbon atoms, perfluoroalkylenedioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl, with at least one different triazapentadiene polymer consisting essentially of at least one triazapentadiene unit of the formula:

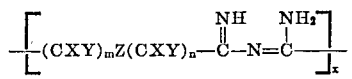

as defined hereinbefore, at a temperature between about −80 and 120 degrees centigrade, followed by conversion of the resultant triazapentadiene copolymer to the corresponding triazine copolymer by a halogenated acylating and dehydrating agent, and recovering the copolymer so produced.

8. The method of claim 7 wherein the polymer so produced is a block copolymer.

9. The method of claim 7 wherein the polymer so produced is a random copolymer.

10. The method of claim 7 wherein the polymer so produced is an alternating copolymer.

11. The method of claim 6 which comprises converting a linear or essentially linear bis(triazapentadiene) to the corresponding bis(triazinylene) by an acylating and dehydrating agent, and recovering the product so produced.

12. The method of claim 6 which comprises reacting a linear or essentially linear bis(triazapentadiene) with a halogen containing diacyl halide, followed by reaction with a dehydrating agent, and recovering the triazine polymer so produced.

13. The method of claim 11 wherein the bis(triazapentadiene) is perfluorooctamethylene - bis(perfluoroheptyl triazapentadiene) and the acrylating and dehydrating agent is trifluoroacetic anhydride.

14. The method of claim 6 wherein the reaction is carried out in the presence of a diluent.

15. The method of claim 6 wherein the conversion temperature range is between minus 80 and 200 degrees centigrade, 16. The method of claim 6 wherein the acylating and dehydrating agent is a perhaloalkanoic anhydride.

17. The method of claim 16 wherein the acylating and dehydrating agent is trifluoroacetic anhydride.

18. The method of claim 16 wherein the acylating and dehydrating agent is perfluorobutyric anhydride.

19. The method of claim 16 wherein the acylating and dehydrating agent is perfluorooctanoic anhydride.

20. The method of claim 6 wherein the acylating and dehydrating agent is a cyano perhalo lower alkanoyl halide or a cyano perhalo lower alkanoic anhydride.

21. The method of claim 20 wherein the acylating and dehydrating agent is a cyano perfluorobutyryl chloride.

22. The method of claim 6 wherein the acylating and dehydrating agent is a halogen-containing cyclic anhydride.

23. The method of claim 22 wherein the acylating and dehydrating agent is perfluoroglutaric anhydride.

24. The method of claim 6 wherein the acylating and dehydrating agent is a halogen-containing diacyl halide.

25. The method of claim 24 wherein the acylating and dehydrating agent is perfluoroglutaryl chloride.

26. The method of claim 6 wherein the acylating and dehydrating agent is an omega-hydroperhalo alkanoic anhydride.

27. The method of claim 6 wherein at least two acylating and dehydrating agents are used.

28. The method of claim 27 wherein the acylating and dehydrating agents comprise cyano perfluorobutyryl chloride and perfluorobutyric anhydride.

29. The method of claim 27 wherein the acylating and dehydrating agents comprise perfluoroglutaric anhydride and perfluorobutyric anhydride.

30. The method of claim 27 wherein the acylating and dehydrating agents comprise perfluoroadipyl chloride and perfluorobutyric anhydride.

31. The method of claim 12 wherein the bis(triazapentadiene) is perfluorohexamethylene bis(perfluoroheptyltriazapentadiene), the halogen-containing diacyl halide is perfluoroadipyl chloride, and the dehydrating agent is perfluorobutyric anhydride.

32. A monotriazine compound of the formula:

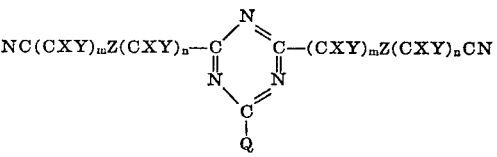

wherein each X is selected from chlorine and fluorine, each Y is selected from halogen and perhalo lower alkyl, $m$ and $n$ are positive integers greater than zero,

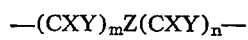

is a divalent polyhalo organic radical having 4 to 45 carbon atoms, Z is selected from at least one of perhalo lower alkylene, perhalo lower alkylidene, omega-hydroperhalo lower alkylidene, keto, oxy, thio, sulfoxide, sulfone,

wherein R is perhalo lower alkyl or omega-hydroperfluoro lower alkyl, polyperfluorooxyalkylene where each alkylene unit has from two to ten carbon atoms, poly(perfluoroalkylenedioxy) where each alkylene unit has from 2 to 10 carbon atoms, perfluoroalkylene dioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhalodecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl, and Q is a halogenated organic pendant group selected from the group consisting of halo lower alkyl and substituted halo lower alkyl where the substituents are chosen from alkoxycarbonyl-, carbamoyl-, carboxy-, haloformyl-, nitro-, nitroso, dialkoxy phosphonate-, perhalo lower alkoxy-, aryl-, halogenated aryl-, cyano-, perhalo lower alkene, and perhalo lower alkyne, perfluoro lower alkyl polyoxyalkylene where each alkylene unit has from 2 to 10 carbon atoms and the units are from one to 35 in number.

33. The monotriazine of claim 32 wherein the

—(CXY)$_m$Z(CXY)$_n$— radicals are perfluoroalkylene groups of 4 to 45 carbon atoms.

34. The monotriazine of claim 32 wherein the perfluoroalkylene groups are perfluorohexamethylene groups.

35. The monotriazine of claim 32 wherein the perfluoroalkylene groups are perfluorotetramethylene groups.

36. The monotriazine of claim 32 wherein the perfluoroalkylene groups are perfluorooctamethylene groups.

37. A bis(triazine) polymer of the formula:

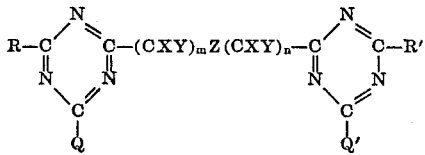

wherein R and R' are each selected from perhalo lower alkyl and omega-hydroperfluoro lower alkyl and

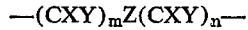
—(CXY)$_m$Z(CXY)$_n$— is a divalent polyhalo organic radical having 4 to 45 carbon atoms, m and n are positive integers greater than zero, Z is selected from at least one of perhalo lower alkylene, perhalo lower alkylidene, omega-hydroperhalo lower alkylidene, keto, oxy, thio, sulfoxide, sulfone,

R N—O— poly-perfluorooxyalkylene where each alkylene unit has from two to ten carbon atoms, poly(perfluoroalkylenedioxy) where each alkylene unit has from 2 to 10 carbon atoms, perfluoroalkylenedioxy, perhalo lower alkylamino, perhalocyclopentylene, perhalocyclohexylene, perhalopyridinediyl, perhalopyrazolidinediyl, perhalopyranylene, perhalopiperidylene, perhalophenylene, perhalonaphthalenediyl, perhaldecalinylene, oxadiazolylene, triazolylene, triazinylene and aryl perhalo lower alkylene wherein substituents on the said aryl group are selected from hydrogen, lower alkenyl, chloro, fluoro, lower alkoxy, nitro, nitroso, cyano, and alkoxy carbonyl, and Q and Q' are each a halogenated organic pendant group selected from the group consisting of halo lower alkyl and substituted halo lower alkyl where the substituents are chosen from alkoxycarbonyl-, carbamoyl-, carboxy-, haloformyl-, nitro-, nitroso, dialkoxy phosphonate-, perhalo lower alkoxy-, aryl-, halogenated aryl-, cyano-, perhalo lower alkene, and perhalo lower alkyne, perfluoro lower alkyl polyoxyalkylene where each alkylene unit has from 2 to 10 carbon atoms and the units are from one to 35 in number.

38. The bis(triazine) in accordance with claim 37: bis-(perfluoroheptyl) perfluorotetramethylene triazine.

39. The bis(triazine) in accordance with claim 37: bis-(perfluoroheptyl) perfluorohexamethylene triazine.

40. The bis(triazine) in accordance with claim 37: bis-(perfluoropropyl) perfluorohexamethylene triazine.

41. The bis(triazine) in accordance with claim 37: bis-(perfluoropropyl) perfluorooctamethylene triazine.

42. The bis(triazine) in accordance with claim 37: perfluorooctamethylene bis(perfluoroheptyl perfluoromethyl) triazine.

References Cited
UNITED STATES PATENTS 3,354,204  11/1967  Dorfman et al. _____ 260—551
3,369,002  2/1968  Griffin _____ 260—78.4

JAMES A. SEIDLECK, Primary Examiner

C. A. HENDERSON, Jr., Assistant Examiner

U.S. Cl. X.R.

260—2.63 N, 78.4, 79.3, 239, 79, 248; 117—128.4, 161 UA; 252—51